(12) United States Patent
Chen et al.

(10) Patent No.: US 6,175,862 B1
(45) Date of Patent: Jan. 16, 2001

(54) HOT OBJECTS WITH SEQUENCED LINKS IN WEB BROWSERS

(75) Inventors: Jeane Shu-Chun Chen; Ephraim Feig, both of Chappaqua, NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/098,706

(22) Filed: Jun. 17, 1998

(51) Int. Cl.⁷ ............................. G06F 13/38; G06F 15/17
(52) U.S. Cl. .................. 709/218; 709/250; 704/233; 704/276; 395/615
(58) Field of Search .................... 395/200, 615; 704/233, 276; 370/94

(56) References Cited

U.S. PATENT DOCUMENTS

| | | | |
|---|---|---|---|
| 5,289,470 | * | 2/1994 | Chang et al. ........................... 370/94 |
| 5,706,507 | * | 1/1998 | Scloss ................................... 395/615 |
| 5,774,664 | * | 6/1998 | Hidary et al. ......................... 395/200 |
| 5,774,666 | * | 6/1998 | Portuesi ................................ 395/200 |
| 5,983,176 | * | 11/1999 | Hoffert et al. ....................... 704/233 |
| 5,983,190 | * | 11/1999 | Trower, II et al. .................. 704/276 |

* cited by examiner

*Primary Examiner*—Zarni Maung
*Assistant Examiner*—Farzaneh Farahi
(74) *Attorney, Agent, or Firm*—Scully, Scott, Murphy & Presser; Daniel P. Morris, Esq.

(57) ABSTRACT

The present invention extends a standard HTML browser to support a new data type, the Uniform Resource Locator Sequence (URLS). The URLS consists of a header and a sequence of URLs. The method of the present invention receives the URLS data then sequentially accesses the data of each URL comprising the URLS, obtains statistics on the response time to the requests for URLs, and times the calls for subsequent URLs in the sequence accordingly so that the arrival of the linked data nearly simulates actual streaming.

20 Claims, 3 Drawing Sheets

| URL(j) | T(j) | B(J) |
|---|---|---|

| Header | URLS(1) | URLS(2) | ..... | ..... | URLS(n) |
|--------|---------|---------|-------|-------|---------|

FIG. 1

| URL(j) | T(j) | B(J) |
|--------|------|------|

FIG. 2

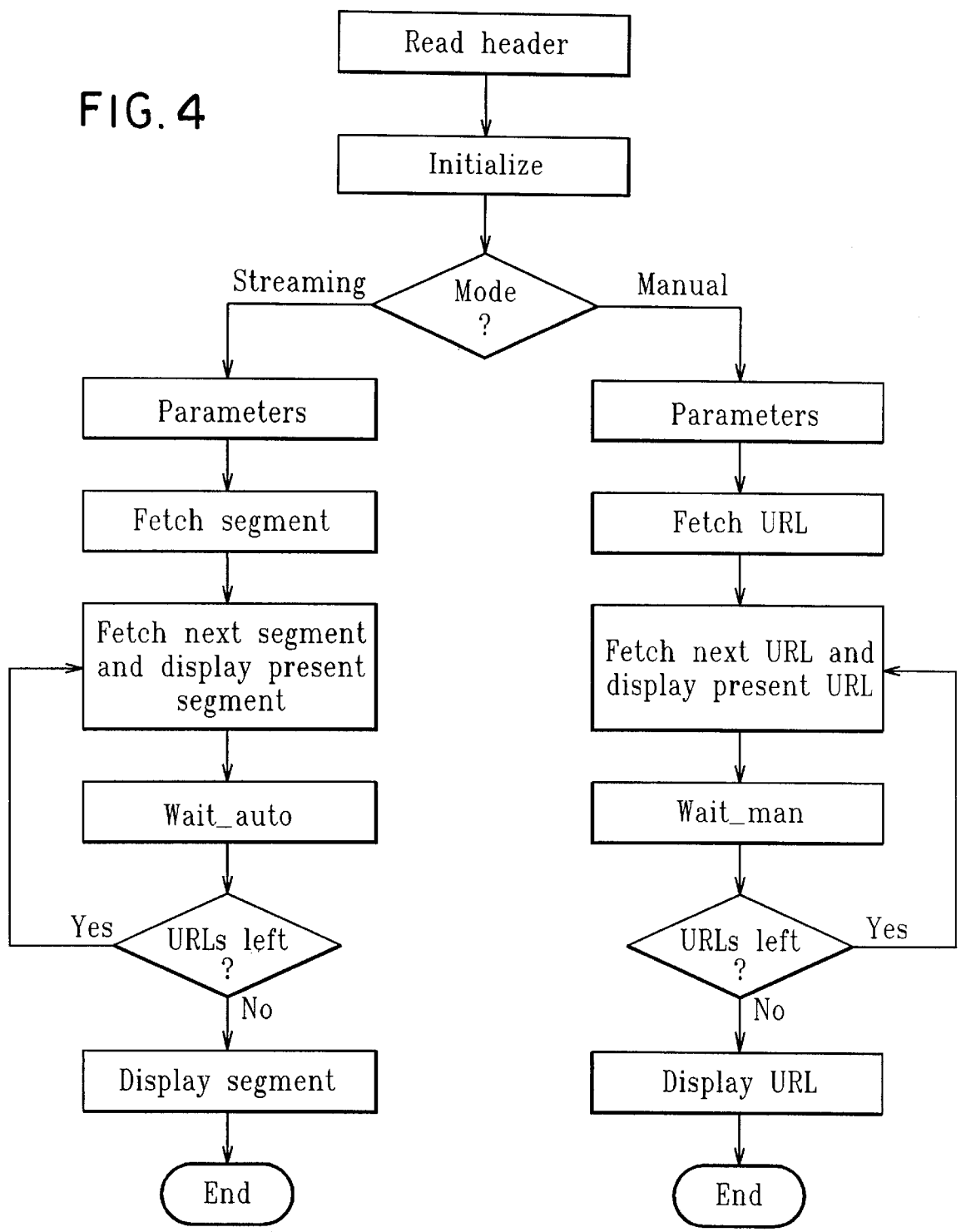

HOT OBJECTS WITH SEQUENCED LINKS IN WEB BROWSERS

BACKGROUND OF THE INVENTION

1. Field of the Invention

The present invention relates to Internet and Intranet Browsers, more specifically, to Browsers equipped with functionality to process a sequence of URL requests automatically. This capability allows the Browser to induce a non-streaming server to simulate a streaming server.

2. Discussion of Prior Art

Internet Browsers are computer programs that simplify and make convenient viewing and navigating through documents on the World Wide Web (Web), written in the Hypertext Markup Language (HTML). Two of the most popular browsers are the Netscape's Navigator, home page http://www.netscape.com, and the Microsoft's Internet Explorer, home page http://www.microsoft.com/ie/default.esp. All Web browsers provide a graphical user interface with standard point-and-click navigation methods and HTML file support.

HTML documents linked to other HTML documents on the Internet are called hypertext documents. Hypertext documents with multimedia capabilities are called hypermedia documents. The links, connecting hypertext documents, are called hyperlinks or hot links. Hyperlinks often appear in the hypertext documents behind the highlighted text, a word or a phrase usually describing something of which a user might want further information. The region of the hypertext document where the hyperlink appears as text is called hot object.

To activate a hyperlink, the user must point and click on the hot object by using a computer pointing device such as a keyboard or a mouse. The user's computer screen display is then changed to display the linked hypertext document, which typically contains more information on the highlighted word or phrase of the hot object. Hyperlinks make it easy to follow cross-references between documents.

The hypertext documents and other data on the Web are found and retrieved by the means of the Uniform Resource Locator (URL). The URL complies with a draft standard for specifying an object on the Internet. It specifies the object format, the access method, and the location of the object. The object's formats are specified as Multipurpose Internet Mail Extensions (MIME). The following are a few formats on the Web.

.au—the most common audio format,
.html—hypertext markup language,
.jpg—still images encoded using Joint Picture Experts Group standards,
.mid—midi music,
.mpg—video images encoded using Motion Picture Experts Group standard, and
.ps—post script.

Each hot object in hypertext files is linked to a unique URL. Often having a hot object linked to a sequence of URLs is desirable. For example, a presentation may consist of a sequence of HTML files, each of which is linked by a URL. The author may want this presentation of HTMLs to be shown in sequence, each lasting some predetermined amount of time. Another situation arises when a sequence of video segments is located at various URLS, when linked together such sequences comprise one contiguous selection of video.

Video is the dominant medium in entertainment and is rapidly becoming common in computing environments. Viewing a sequence of video segments in contiguous fashion is very desirable for a viewer, so as to simulate viewing the entire video being streamed from a server. Providing the user with one hot object that would automatically direct the request to the multitude of URLs in a sequence is therefore desirable, with the request being executed either automatically or manually by the viewer.

A conventional non-streaming server is insensitive to isochronous requirements. In general, that type of server is designed for minimal transfer latency. Without explicit mechanisms to ensure isochronism, delivery rates of data to a browser are irregular, resulting in erratic playback quality at client machines. To avoid an erratic playback of video files, the usual approach is to download to the host computer whole video files before starting the video playback. Video data is typically very voluminous. Compressed video formats such as MPEG-1, Indeo, QuickTime-MOV, and Cinepack require about 10 MB to store one minute of video data. When the bandwidth of the channel is too low to support the bit rate of the particular video, this approach of downloading of whole video files before starting the video or some modification of it is inevitable.

One such modification is to obtain statistics of the download rate, and together with the bit rate of the video compute a reasonable starting time for playback so that the entire video may be played without glitches. This scheme reduces the latency between the request for the video and the start of the playback. When the bandwidth of the channel is greater than that required for a real-time playback, a non-streaming server may overwhelm the storage of the receiving playback system.

Streaming video is primarily intended to address this situation. A streaming server delivers video streams isochronously, so that the video playback is guaranteed to have smooth motion and sound, provided that the channel bandwidth is high enough. The streaming server sends video data at controlled bit rates that match the bit rate of the encoded video. One drawback of streaming video files is that the receiving playback system cannot support random seeks. A user viewing streaming video must always begin viewing from the beginning of the file, or at best from that portion of the file that is cached. When seeking video to the future point in time, for example, the viewer has to wait for the server to stream all the video data prior to the desired seek position.

SUMMARY OF THE INVENTION

The present invention extends a standard HTML browser to support a new data type, the Uniform Resource Locator Sequence (URLS). The URLS consists of a header containing descriptive information and a sequence of URLs. The URLs may be a sequence of pre-existing files, or a new sequence of URL's may be created by partitioning a data resource such as video into contiguous time segments, storing each segment in an Internet location and creating a URL for each of these segments.

The browser receives the URLS data, sequentially accesses the data of each URL comprising the URLS initiating the requests at times dependent on the bandwidth of the channel and various parameters provided by the data in the header portion of URLS. When the various URLs constitute contiguous segments such as from a video sequence, and the requests are timed appropriately, the effect is that of simulating streaming of video.

BRIEF DESCRIPTION OF THE DRAWINGS

FIG. 1 illustrates the structure of the URLS;

FIG. 2 illustrates the structure of the URL(j) component of a URLS;

FIG. 4 shows a flow chart diagram of the preferred embodiment of the present invention.

DETAILED DESCRIPTION OF THE PREFERRED EMBODIMENTS

Figure 3:
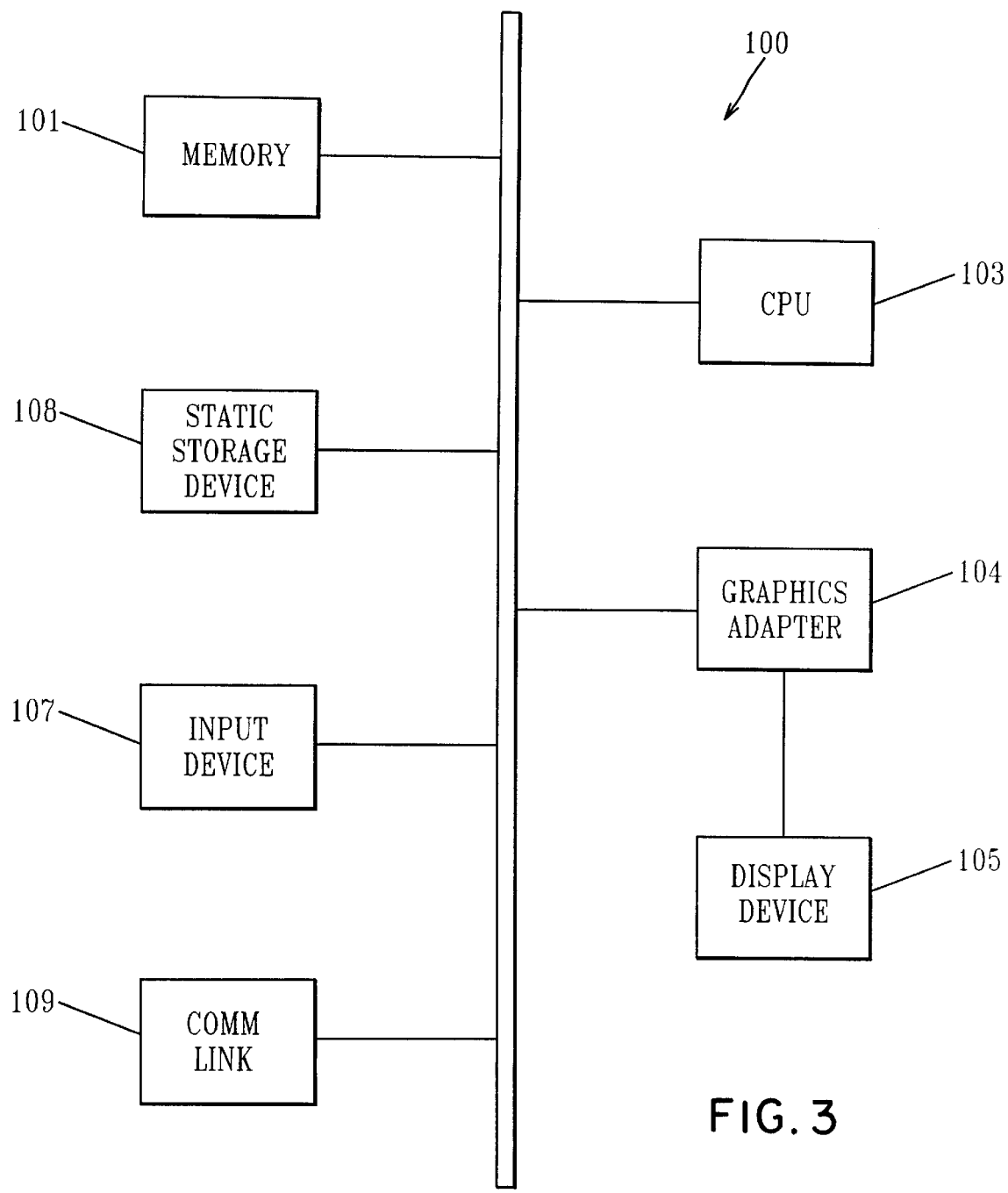
FIG. 3 illustrates a computer processing system utilized in the implementation of the preferred embodiment.

Although this invention has been found particularly useful in the environment of video data, this invention can also be applied to various other types of data, such as but not limited to audio data.

Figures 1, 2:
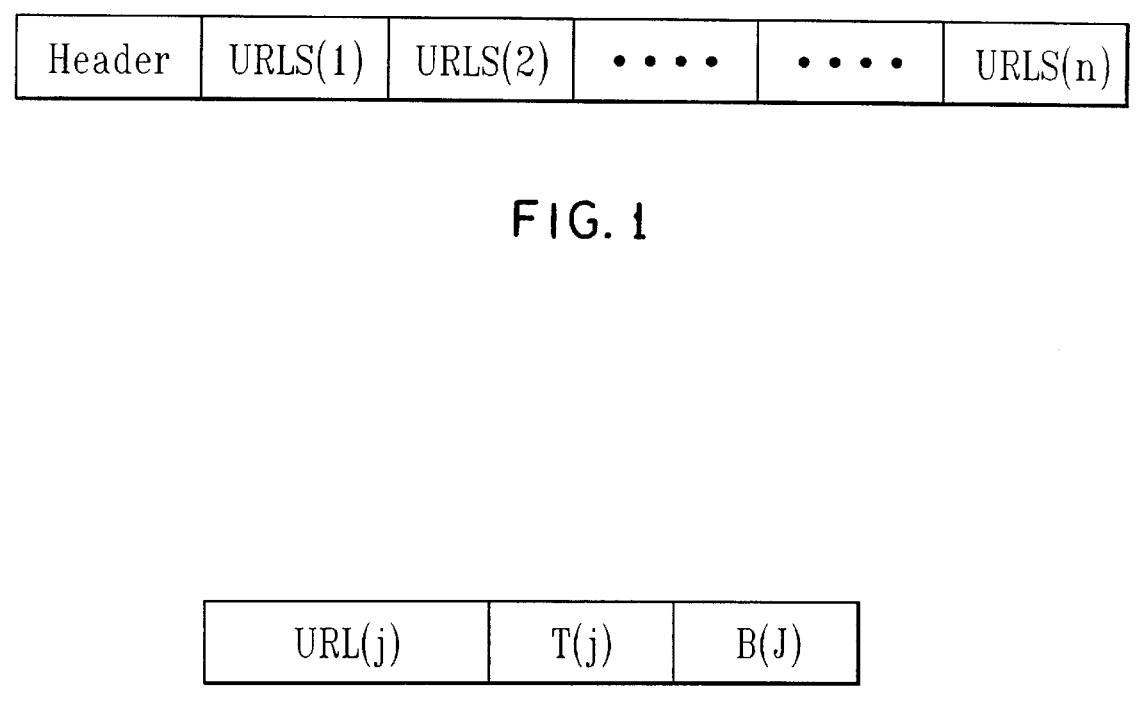

The preferred embodiment of the present invention extends a standard HTML browser to support a new data type. FIG. 1 shows the structure of this new data type, the Uniform Resource Locator Sequence (URLS). A URLS consists of a Header, containing a header file, and an ordered list URLS(j), where j is an index ranging from 1 to n.

The Header file contains information regarding the type of data contained in the various subsequent URLS. Such data type may be text, images, audio, video, and other types of data. The Header also contains information regarding what, if any, computer plug-ins or extras are necessary for processing the data in the subsequent URLs, and whether or not streaming needs to be simulated. A browser simulating streaming is said to be in a streaming mode.

The structure of a URLS(j), shown in FIG. 2, contains URL(j), a time duration parameter T(j), and a value B(j) representing the size of the corresponding data. A URL(j) is the URL for the jth entry of the URLS. Typically the time duration parameter T(j) will signify that the browser exhibits the contents of the URL(j) for T(j) period.

The present invention may be implemented on any computer processing system including, for example, a personal computer or a workstation. As shown in FIG. 3, a computer processing system which may be utilized by the present invention generally comprises the memory 101, one or more central processing units (CPU) 103, and one or more user input devices 107, such as a keyboard, a mouse, a joystick, a voice recognition system, or a handwriting recognition system. The computer processing system of the present invention includes a nonvolatile memory such as ROM and other nonvolatile storage devices 108 such as a fixed disk drives that store operating systems and application programs that are loaded into the memory 101 for execution by the CPU 103. In the execution of operating systems and application programs the CPU 103 may use data stored in the nonvolatile storage device 108 and memory 101.

The computer processing system of the present invention further includes a graphics adapter 104 coupled between the CPU 103 and a display device 105 such as a CRT display or a LCD display. The application program and the operating system executed by the CPU 103, generate graphics commands, for example a command to draw a box (or a window), to display a bit map image, to render a three dimensional model, or to display a video file. Such commands may be handled by the application program or the operating system executed by the CPU 103 or by the hardware that works in conjunction with the application program and the operating system executed by the CPU 103, wherein the appropriate pixel data is generated and the display device 105 is updated accordingly.

In addition, the computer processing system includes a communication link 109, such as a network adapter or a modem coupled to the CPU 103, that allows the CPU 103 to communicate with other computer processing systems over the communication link, for example over the Internet. The CPU 103 may receive portions of the operating system, portions of the application programs, or portions of the data used by the CPU 103 in executing the operating system and application programs over the communication link 109.

Application programs and the operating system executed by the CPU 103 may perform the methods of the present invention described below. Alternatively, portions or all of the methods described below may be embodied in hardware that works in conjunction with the application program and the operating system executed by the CPU 103. In addition, the methods described below may be embodied in a distributed processing system whereby portions of such methods are distributed among two or more processing systems that are linked together via communication link 109.

According to the preferred embodiment of the present invention, described in a flow chart shown on FIG. 4, the user launches a hyperlink by clicking on the hot object appearing on the HTML page displayed by the browser, such hot object having a link to a URLS. Recognizing the URLS data type, the browser responds by executing a sequence of computer instructions.

The "Read header" module is called to extract the necessary information from the header portion of the URLS. The header information is passed to the "Initialize" module. Based on the information in the header file, the "Initialize" module causes the browser to launch the appropriate functions necessary to execute one or more desired applications. For example, if the data in the URLs comprise segments from a video stream, the browser will spawn (start up) on the host computer the appropriate video decoders and players.

Next, the "Mode?" module reads the part of the header file that specifies whether the data pointed to by URLS is intended for the streaming mode playback, or whether the choice of streaming mode versus manual mode will be left to the user. If the header indicates the streaming mode, the playback mode is set automatically to streaming. Otherwise, the browser will output a query to the computer screen, prompting the user to input which of the two modes the user wishes to execute as a playback. The user then may respond by making the appropriate choice. A default value may be chosen by the browser if the user chooses not to reply to the query.

In the streaming mode, the timing of the transitions between the various data of the different URLs is crucial. As an illustration, consider the URLs comprising contiguous segments from a video sequence. Streaming succeeds only if $TD(j+1)+A(j+1)<T(j)$, where $TD(j)$ is the time delay between the time the browser initiates a request for URL(j) and the time the first data packet from URL(j) arrives at the browser. $A(j)$ is the time duration for all data from URL(j) to arrive, that is the time duration from when the first data packet arrives till the last data packet arrives.

The "Parameters" module enables the user to choose a minimum time duration for uninterrupted display of the streaming data. The user is prompted to choose a time duration value T, such that in case streaming of the entire program is not possible, at least segments of time duration T will be played continuously. Predefined or default values may be used instead of user input.

In the streaming mode, the "Parameters" module then partitions the URLs comprising the URLS into segments segment 1—(URL($A_0$), ..., URL($A_1$)),
segment 2—(URL($A_1$+1), ..., URL($A_2$)),
segment 3—(URL($A_2$+1), ..., URL($A_3$)), etc., such that $$T(1)+\ldots+T(A_1-1)<T \text{ and } T(1)+\ldots+T(A_1)>T,$$

$$T(A_1+1)+\ldots+T(A_2-1)<T \text{ and } T(A_1+1)+\ldots+T(A_2)>T, \text{ etc.}$$

The display of the last segment cannot be guaranteed to satisfy the requirement. Therefore the buffer size BUFF required to store the segment with the largest amount of data is determined utilizing the B(j) value in the URLS(j). BUFF is equal to the maximum $B(A_k+1)+B(A_k+2)+\ldots+B(A_{(k+1)})$. It then allocates two buffers, BUFF_A and BUFF_B, each of size BUFF.

Next, the "Fetch segment" module fetches the first segment and stores it in BUFF_A. This involves making requests for URL(1), URL(2), and so on, until URL(A1). As soon as all the data for the first segment arrives, the "Fetch next segment-and display present-segment" module begins fetching the second segment and storing it in BUFF_B and simultaneously displaying the decoded contents from the first segment stored in BUFF_A.

The system continuously watches for the finish of the segment fetch, and the finish of the segment display. This task is performed by the "Wait_auto" module. If the streaming constraints are met, namely TD(j+1)+A(j+1)<T(j), then the fetch will be done before the display. When both fetch and display are done, the "URL's left?" decision module determines whether segments are remaining to be fetched. If there are, the control is passed back to the "Fetch next segment-and display present-segment" module, which initiates a fetch of a next segment, and stores it in the alternate buffer, BUFF_A for segment three. At the same time it starts displaying the decoded output from the current segment, which is already stored in BUFF_B.

This process is continued, with one segment being stored in one buffer and the previous segment being played back from the other, until the "URLs left?" decision module determines that there are no more segments left to fetch. Then, the last segment is displayed by the "Display segment" module and the streaming process terminates with the "End" module.

In accordance with the invention, if the streaming criteria are met, then the entire content of all the URLs comprising the URLS will be displayed in proper timing order as prescribed by the content creator. If the contents of the URLs comprise a video sequence, then the video will be displayed from beginning to end in a continuous manner as is typical when using a streaming server and a stream capable player. The player may be programmed so that after playing each video segment, it may be called upon again to continue playing a subsequent segment. This way, the browser does not have to spawn a new player for every incoming segment.

In the Manual mode, the "Parameters" module allocates at least two buffers BUFF_A and BUFF_B, each buffer equals in size to the maximum B(j). The "Fetch URL" module fetches the data in URL(1) and stores it in a buffer BUFF_A. As soon as all the data from URL(1) has arrived, the "Fetch next URL and display present URL" module begins fetching the data from URL(2), storing it in a buffer BUFF_B and simultaneously displaying the decoded URL (1) data stored in BUFF_A.

The "Wait_man" module continuously monitors the system for a signal from the user to begin fetching data from the next URL. When such signal is detected and all the contents of URL(2) have not arrived, the "Wait_man" module waits until all the contents of URL(2) have arrived. When all the contents of URL(2) have arrived, the "URLs left?" decision module sends the control back to "Fetch next URL and display present URL" module to begin fetching data from the next URL, URL(3) and storing it in the alternate buffer BUFF_A, and simultaneously displaying the decoded URL (2) data stored in BUFF_B.

This process is continued, with buffers interchanging, ping-ponging, until no more URLs are left to fetch. After the "URLs left?" decision module makes that determination, it sends control to the "Display URL" module which displays the decoded data from the last URL and the process is terminated by the "End" module.

The present invention is well suited for viewing video whose compressed data is transmitted from a server, without the need for storing all the data in advance at the local site, and without the need for the server to have streaming capabilities. The video data which will be streamed is partitioned into sequenced segments. A URLS is created, with the URL segment sequence as it's content.

As an illustration, please consider the following. A 60 minute MPEG encoded video stream is partitioned into one minute segments. The data rate of the encoded video is 1.5 Mbps, each one minute segment is therefore encoded with 90 megabits, and the entire video is encoded with 5.4 Gigabits (or 675 MBYTES) of data. The bandwidth from the server to the browser is 3 Mbps. The browser determines that the time delay between its request for data and the beginning of the arrival of the data is less than 20 seconds. The time to deliver a one minute segment of video over the channel is 30 seconds. Thus, the total time from initiating the request for a minute segment till the entire data for that segment arrives is less than 50 seconds, and certainly less than one minute, which is the playing time of one segment. Hence the streaming criteria is satisfied. The browser allocates 2 or more memory buffers, each of 12 megabytes, for temporarily storing the incoming video data, and utilizes them in an alternating fashion.

Having thus described our invention, what we claim as new, and desire to secure by Letters Patent is:

1. A method for creating a Uniform Resource Locator Sequence data type (URLS), the method comprising the steps of:

locating two or more URLs provided by a user to comprise said URLS, each of said URLs being associated with a resource;

determining a type of the resource of each said located URLs;

determining a size of the resource of each said located URLs;

determining a playback time of the resource of each said located URLs; and storing a header including type of resource of said located URLs, and a sequence of entries URLS(j), where j is an integer from 1 to n, where each URLS(j) comprises a URL, the size parameter and the playback time parameter of the respective resource, wherein the data type is used for simulating a streaming server.

2. A method of claim 1, further comprising dividing the resource into a plurality of segments and associating each segment with one of said URLS.

3. A method of claim 2, wherein the division of resources is made according to time.

4. A method of claim 2, wherein the division of resources is made according to size.

5. A method of claim 3, wherein the segments are of approximately equal duration.

6. A method of claim 4, wherein the segments are of approximately equal size.

7. A method for requesting a Uniform Resource Locator Sequence data type (URLS) from a network, the URLS including a header containing types of one or more resources, each of said resources being associated with a URL, and a sequence of entries URLS(j), where j is an integer from 1 to n, where each URLS(j) comprises a URL, a size parameter and a playback time parameter of a respective resource, the method comprising the steps of:

a) initiating URL requests to each of the URLs included in a requested URLS for transmission over a data channel;
 b) determining a timing sequence for the requests according to the timing, size and type parameters contained in said URLS and the bandwidth of the data channel; and
 c) transmitting resources according to the timing sequence determined in step b over the channel for playback, wherein the data type is used for simulating a streaming server.

8. A method of claim 7, further including the step of playing back a resource simultaneously with the transmission of the next resource as described in step c.

9. A method of claim 7, wherein the initiation of the requests to the various URLs comprising the URLS is timed automatically according to a user predetermined timing sequence.

10. A method of claim 7, wherein the initiation of the requests to the various URLs comprising the URLS is timed manually according to a user provided input.

11. A method for requesting a Uniform Resource Locator Sequence data type (URLS) from a network, the URLS including a header containing types of one or more resources, each of said resources being associated with a URL, and a sequence of entries URLS(j), where j is an integer from 1 to n, where each URLS(j) comprises a URL, a size parameter and a playback time parameter of a respective resource, the method comprising the steps of:

a) extracting the type of resources of said URLs from a header portion of a URLS;
 b) initiating one or more computer applications to playback said types of resources of said URLs;
 c) selecting a playback mode;
 d) partitioning the URLs comprising the URLS into segments;
 e) determining a largest segment size BUFF and allocating at least two buffers each of size BUFF;
 f) fetching the first segment and storing it in one of the empty buffers;
 g) fetching the next segment and storing it in an empty buffer, and simultaneously displaying the segment stored in a full buffer until no more segments remain to be fetched; and
 h) displaying the segment stored in the last full buffer and terminating the process, wherein the data type is used for simulating a streaming server.

12. A method of claim 11, wherein the fetching the next segment step further comprises determining whether the next segment fetch should be performed before the next segment display.

13. A method of claim 12, where the playback mode is the streaming mode.

14. A method of claim 13, wherein step c further comprises selecting a minimum time duration for uninterrupted display of data.

15. A method of claim 14, wherein the determination of whether the next segment fetch should be performed before the next segment display is made using a formula $$TD(j+1)+A(j+1)<T(j),$$

where

TD(j) is the time delay between the initiation of a request for the URLS(j) and the time a resource associated with a URL from URLS(j) arrives from the network,
 A(j) is the time duration for all resource data associated with a URL from URLS(j) to arrive, and
 T(j) is the predefined time duration for uninterrupted display of the resource.

16. A method of claim 15, wherein the step of partitioning the URLs comprising the URLS into segments is represented by:

(URL(1), . . . , URL($A_1$)),
 (URL($A_1$+1), . . . , URL($A_2$)),
 (URL($A_2$+1), . . . , URL($A_3$)), etc., such that $$T(1)+ \ldots +T(A_1-1)<T \text{ and } T(1)+ \ldots +T(A_1)>T,$$

$$T(A_1+1)+ \ldots +T(A_2-1)<T \text{ and } T(A_1+1)+ \ldots +T(A_2)>T, \text{ etc.},$$

where

T is a user defined time duration value, and
 $A_k$ is an integer from 1 to n.

17. A method of claim 16, wherein a buffer size BUFF is determined as follows:

$$\text{BUFF}=B(A_k+1)+B(A_k+2)+ \ldots +B(A_{(k+1)}),$$

where $B(A_k)$ is the data size given in URLS($A_k$), and
 $A_k$ is an integer from 1 to n.

18. A method of claim 12, where the playback mode is the manual mode.

19. A method of claim 18, wherein each URL is a segment.

20. A method of claim 11, wherein the playback data is video.

* * * * *